United States Patent [19]
Suzuki et al.

[11] 3,952,167
[45] Apr. 20, 1976

[54] ELECTROMAGNETIC COUPLER FOR USE WITH A TELEPHONE SET

[75] Inventors: Matsumi Suzuki, Ebina; Toshihiko Toyoshima, Tokyo, both of Japan

[73] Assignee: Fuji Xerox Co., Ltd., Tokyo, Japan

[22] Filed: May 30, 1974

[21] Appl. No.: 474,307

[30] Foreign Application Priority Data
June 8, 1973 Japan............... 48-67055[U]

[52] U.S. Cl............................. 179/81 R; 179/1 C
[51] Int. Cl.²................................. H04M 1/00
[58] Field of Search........... 179/81 R, 82, 1 C, 2 C, 179/146 R, 161, 189 R, 1 PC; 339/91 R; 336/183

[56] References Cited
UNITED STATES PATENTS

| | | | |
|---|---|---|---|
| 2,381,097 | 8/1945 | Adams | 179/2 C |
| 2,829,202 | 4/1958 | Spera | 179/1 C |
| 2,911,485 | 11/1959 | Harris | 179/146 R |
| 3,585,303 | 6/1971 | Chieffo | 179/1 C |

*Primary Examiner*—Kathleen H. Claffy
*Assistant Examiner*—Joseph Popek
*Attorney, Agent, or Firm*—Gerald J. Ferguson, Jr.; Joseph J. Baker

[57] ABSTRACT

An electromagnetic coupling device for use with a telephone set having a hand hole in the rear thereof, the coupling device comprising a hollow plug removably insertable in the hand hole; a first winding of wire disposed within the hollow plug for receiving electrical signals from the telephone set; a second winding of wire disposed within the hollow plug for transmitting electrical signals to the telephone set, the wire of the second winding being substantially thicker in cross section than the wire of the first winding.

3 Claims, 3 Drawing Figures

U.S. Patent     April 20, 1976     3,952,167
FIG. 1
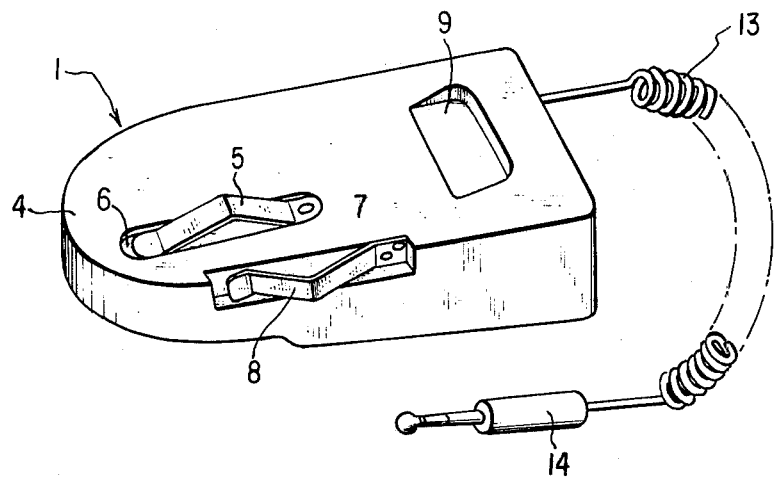
FIG. 3
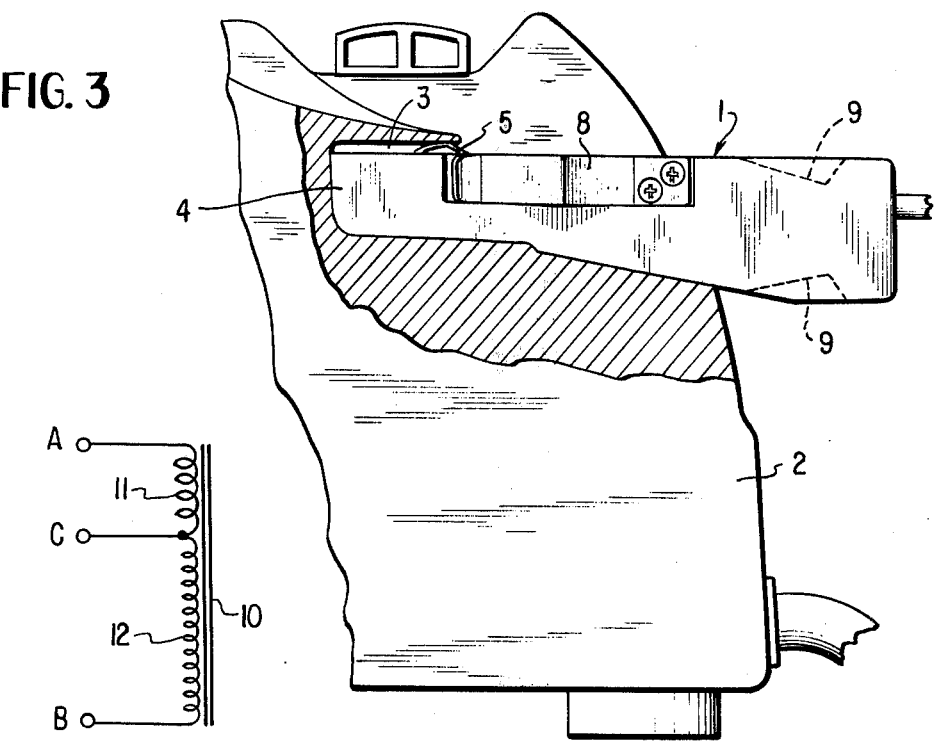
FIG. 2

ELECTROMAGNETIC COUPLER FOR USE WITH A TELEPHONE SET

BACKGROUND OF THE INVENTION

This invention relates to an electromagnetic coupling device and, in particular, to such a device for use with a telephone set.

SUMMARY OF THE INVENTION

A primary object of the present device is the provision of an electromagnetic coupling device having an electromagnetic coil of a fine wire for picking up leakage magnetic flux from a telephone and an electromagnetic coil of thick wire for directly transmitting or receiving a signal through a telephone so that coupling of communications equipment may be made with the telephone thus making it practicable to transmit and receive information through the telephone in a simple manner by merely plugging the coupling device into a hand hole provided on the rear of the telephone.

Other objects and advantages of the invention will become apparent on reading the specification and claims taken with the drawing.

BRIEF DESCRIPTION OF THE DRAWING

FIG. 1 is a perspective view of an illustrative embodiment of the invention;

FIG. 2 is a schematic diagram of an illustrative electromagnetic coil of the invention;

FIG. 3 is a side view of the present invention in an operative state.

DETAILED DESCRIPTION OF PREFERRED EMBODIMENT OF THE INVENTION

Referring to FIGS. 1 and 3, a comparatively flat, hollow case or plug made of an insulating substance has a plugging section 4 removably insertable in a hand hole 3 in the rear of the telephone. Plugging section 4 has a leaf spring 5 disposed on the top surface thereof as shown in FIG. 1. Leaf spring 5 is positioned with one end thereof fixed, in a long groove 6 concavely formed on the top surface of plugging section 4. An intermediate section of the leaf spring is so bent as to project from the top surface of plugging section 4. Another long groove 7 is provided in one side of the plugging section. Another leaf spring 8 is positioned in long groove 7, with one end fixed at one end of the long groove. Leaf spring 8 also has the intermediate section thereof bent and it projects sidewards. As can be seen in the Figures, the end section opposite to plugging section 4 is slightly thicker than the plugging section. Holding grooves 9 indented in the upper and lower surfaces are also provided.

Disposed within case 1 is a ferrite core 10, which is schematically shown in FIG. 2. Ferrite core 10 has a thick wire coiled thereon of approximately 150–200 windings to provide an electromagnetic transmission coil 11. A wire thinner than electromagnetic coil 11 of approximately 1,000–2,000 windings is also coiled on ferrite core 10 in electrical series with electromagnetic coil 11 to thus provide an electromagnetic reception coil 12. The coils 11 and 12 are connected to a lead wire 13 which passes through the rear of case 1. Lead wire 13 may have a jack 14 for connecting wire 13 to a communications facility such as a facsimile transmitter or receiver.

In operation, plug 1 is inserted in hand hole 3 and supported by the elasticity of leaf springs 5, 8. A connection with a communication facility via the telephone is effected as follows. A signal received by the telephone generates a leakage magnetic flux within the phone which is sensed by electromagnetic reception coil 12. Since this coil is made of a thin wire, it detects very low amplitude signals. When a signal is to be transmitted from the phone, a high amperage current passes through electromagnetic transmission coil 11 due to the thickness thereof and thus an alternating voltage is generated in the induction coil within telephone 2. Thus information can be directly transmitted with a telephone without having to use a special transmitter or receiver.

What is claimed is:

1. An electromagnetic coupling device for use with a telephone set having a hand hole in the rear thereof, said telephone set being employed in a communication facility having a transmitting device and a receiving device, said coupling device comprising
    a hollow plug removably insertable in said hand hole;
    a first winding of wire disposed within said hollow plug for receiving electrical signals from said telephone set, said first winding being connected to said receiving device; and
    a second winding of wire disposed within said hollow plug for transmitting electrical signals to said telephone set, said wire of said second winding being substantially thicker in cross section than the wire of said first winding, said second winding being connected to said transmitting device.

2. A coupling device as in claim 1 including a ferrite core disposed within said hollow plug, said first and second windings being connected in electrical series on said ferrite core.

3. An electromagnetic coupling device for use with a telephone set having a hand hole in the rear thereof, said telephone set being employed in a communication facility having a transmitting device and a receiving device, said coupling device comprising
    a hollow plug removably insertable in said hand hole;
    a ferrite core disposed within said hollow plug;
    a first winding of wire on said ferrite core for receiving electrical signals from said telephone set, said first winding being connected to said receiving device; and
    a second winding of wire on said ferrite core for transmitting electrical signals to said telephone set, said wire of said second winding being substantially thicker in cross section than the wire of said first winding, said second winding being connected to said transmitting device and said first and second windings being connected in electrical series on said ferrite core.

* * * * *